(12) United States Patent
Marzorati et al.

(10) Patent No.: US 12,240,174 B2
(45) Date of Patent: Mar. 4, 2025

(54) CONTINUOUS 3D PRINTING (71) Applicant: International Business Machines Corporation, Armonk, NY (US)

(72) Inventors: Mauro Marzorati, Lutz, FL (US); Faith Opiyo, Nieuw Vennep (NL); Jeremy R. Fox, Georgetown, TX (US); Vinod A. Valecha, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/057,240

(22) Filed: Nov. 21, 2022

(65) Prior Publication Data

US 2024/0165877 A1    May 23, 2024

(51) Int. Cl.
| | |
|---|---|
| *B29C 64/241* | (2017.01) |
| *B29C 64/118* | (2017.01) |
| *B29C 64/209* | (2017.01) |
| *B29C 64/245* | (2017.01) |
| *B29C 64/35* | (2017.01) |
| *B33Y 10/00* | (2015.01) |
| *B33Y 30/00* | (2015.01) |
| *B29K 55/02* | (2006.01) |

(52) U.S. Cl.
CPC .......... *B29C 64/241* (2017.08); *B29C 64/118* (2017.08); *B29C 64/209* (2017.08); *B29C 64/245* (2017.08); *B29C 64/35* (2017.08); *B33Y 10/00* (2014.12); *B33Y 30/00* (2014.12); *B29K 2055/02* (2013.01)

(58) Field of Classification Search
CPC ....... B29C 64/20; B29C 64/35; B29C 64/118; B29C 64/209; B29C 64/241; B29C 64/245; B29C 64/176; B33Y 10/00; Y02P 10/25

See application file for complete search history.

(56) References Cited

U.S. PATENT DOCUMENTS

| | | | |
|---|---|---|---|
| 4,015,702 A * | 4/1977 | Bergling | B23K 9/0256 198/747 |
| 10,538,030 B2 | 1/2020 | Desimone | |
| 10,591,880 B2 | 3/2020 | Bostick | |
| 10,953,603 B2 | 3/2021 | Goldman | |
| 10,987,869 B2 | 4/2021 | Linnell | |

(Continued)

FOREIGN PATENT DOCUMENTS

WO    WO-2022224550 A1 * 10/2022

OTHER PUBLICATIONS

Anonymous, "Batch production", From Wikipedia, the free encyclopedia, This page was last edited on Feb. 2, 2022, 2 pages, <https://en.wikipedia.org/wiki/Batch_production>.

Anonymous, "Continuous production", From Wikipedia, the free encyclopedia, This page was last edited on Sep. 7, 2022, 5 pages, <https://en.wikipedia.org/wiki/Continuous_production>.

(Continued)

*Primary Examiner* — Jerzi H Moreno Hernandez
(74) *Attorney, Agent, or Firm* — Onyx IP Group (57) ABSTRACT

A method of 3D printing, a 3D printing system, and a vertical conveyor are disclosed herein. The 3D printing system comprises a vertical conveyor having a plurality of folding build plates; a plurality of biasing devices, a biasing device being configured to rotate a folding build plate from a folded position to a substantially horizontal position when the folding build plate enters a printing chamber position, and a 3D print head inside the print chamber adapted to 3D print an object on the folding build plate in the substantially horizontal position.

10 Claims, 4 Drawing Sheets

(56) References Cited

U.S. PATENT DOCUMENTS

| | | | |
|---|---|---|---|
| 11,059,222 B2 | 7/2021 | Dunne | |
| 11,237,542 B2 | 2/2022 | Mark | |
| 11,385,777 B2 | 7/2022 | Grigore | |
| 11,390,062 B2 | 7/2022 | Desimone | |
| 2013/0108726 A1* | 5/2013 | Uckelmann | B29C 64/245 425/375 |
| 2015/0290878 A1* | 10/2015 | Houben | B29C 64/245 264/603 |
| 2016/0288416 A1* | 10/2016 | Robles Flores | B29C 64/112 |
| 2017/0028646 A1* | 2/2017 | Sun | B33Y 30/00 |
| 2017/0173892 A1* | 6/2017 | Steele | B29C 64/129 |
| 2017/0297267 A1 | 10/2017 | Liu | |
| 2018/0290383 A1 | 10/2018 | Dawson | |
| 2019/0009334 A1* | 1/2019 | Effernelli | B33Y 30/00 |
| 2020/0009795 A1 | 1/2020 | Gibson | |
| 2020/0269507 A1* | 8/2020 | Go | B29C 64/20 |
| 2021/0138552 A1 | 5/2021 | Hildreth | |
| 2021/0299958 A1 | 9/2021 | Gifford | |
| 2021/0402699 A1* | 12/2021 | Díaz Castro | B29C 64/245 |
| 2022/0126509 A1 | 4/2022 | Pattekar | |
| 2022/0168812 A1 | 6/2022 | Gibson | |
| 2022/0184891 A1 | 6/2022 | Novick | |
| 2022/0184894 A1 | 6/2022 | Oh | |
| 2022/0203617 A1* | 6/2022 | Pekic | B29C 64/245 |
| 2022/0229762 A1 | 7/2022 | Stan | |
| 2023/0391001 A1* | 12/2023 | Feldmann | B29C 64/245 |
| 2024/0139816 A1* | 5/2024 | Ueda | B29C 64/245 |

OTHER PUBLICATIONS

Anonymous, "With 24.3% CAGR, 3D Printing Market Size Worth USD 83.90 Billion in 2029", GlobeNewswire, Apr. 19, 2022, 7 pages, <https://www.globenewswire.com/en/news-release/2022/04/19/2424496/0/en/With-24-3-CAGR-3D-Printing-Market-Size-Worth-USD-83-90-Billion-in-2029.html>.

Colucci et al., "Increasing 3D Printer Throughput With Automated Part Removal", In Partial Fulfillment of a Major Qualifying Project Worcester Polytechnic Institute, Aug. 2019-May 2020, 124 pages.

Nagar et al., "Narrow Passage Repair Using 3D Printing", U.S. Appl. No. 17/444,924, filed Aug. 12, 2021, 37 pages.

Nguyen et al., "Development of a Robotic System for Automated Decaking of 3D-Printed Parts", arXiv:2003.05115v1 [cs.RO] Mar. 11, 2020, 7 pages.

Tammaro et al., "Continuous 3D Printing of Hierarchically Structured Microfoamed Objects", Adv. Eng. Mater. 2022, 24, 2101226, 10 pages, DOI: 10.1002/adem.202101226.

Velez et al., "Koala 3D: A Continuous Climbing 3D Printer", Robotics and Computer Integrated Manufacturing 64 (2020) 101950, Available online Mar. 10, 2020, 11 pages, https://doi.org/10.1016/j.rcim.2020.101950.

Yao et al., "3D Printing of Objects with Continuous Spatial Paths by a Multi-Axis Robotic FFF Platform", Appl. Sci. 2021, 11, 4825, Published: May 24, 2021, 15 pages, https://doi.org/10.3390/app11114825.

* cited by examiner

CONTINUOUS 3D PRINTING

BACKGROUND

The present disclosure relates to three-dimensional (3D) printing techniques, and more specifically, to continuous 3D printing utilizing a collapsible build plate.

The development of the EDVAC system in 1948 is often cited as the beginning of the computer era. Since that time, computer system have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

One application of this new capability is three-dimensional (3D) printing. Three-dimensional printing, also referred to as additive manufacturing, typically involves receiving a computer-aided design (CAD) model, splitting the CAD model into numerous layers, and then printing each layer sequentially to physically form the component. The 3D printer hardware, in turn, may utilize one or more of any number of techniques or processes that are configured to fuse, join, or otherwise combine material. For example, 3D printing may be performed by vat photopolymerization, material jetting, binder jetting, powder bed fusion, material extrusion, directed energy deposition, sheet lamination, and/or other techniques.

3D printing has been successfully used in rapid prototyping and in custom manufacturing of relatively small numbers of components.

SUMMARY

According to embodiments of the present disclosure, a method of 3D printing, comprising positioning a build plate at a top of a printing chamber in a folded-down position. The method may further comprise moving the folded-down build plate to a printing level. The method may further comprise, at the printing level, unfolding the build plate to provide a substantially horizontal surface for supporting an item to be printed. The method may further comprise 3D printing an object on the unfolded build plate.

According to embodiments of the present disclosure, a 3D printing system, comprising a vertical conveyor having a plurality of folding build plates. The system may further comprise a first biasing device that rotates the plurality of folding build plates between a folded position and a substantially horizontal position when the build plate enters a print chamber. The system may further comprise a 3D print head inside the print chamber adapted to 3D print an object on the substantially horizontal build plate.

According to embodiments of the present disclosure, a vertical conveyor, comprising a plurality of folding build plates adapted to support an object during a 3D printing operation. The vertical conveyor may further comprise a first biasing device that rotates the plurality of folding build plates between a folded position and a horizontal position before initiating the 3D printing operation.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to three-dimensional (3D) printing techniques; more particular aspects relate to continuous 3D printing utilizing a collapsible build plate. While the present disclosure is not necessarily limited to such applications, various aspects of the disclosure may be appreciated through a discussion of various examples using this context.

Most manufacturing systems can be divided into two basic categories: batch and continuous. Batch processes involve the processing of bulk material in groups through each operation of the process. Processing of subsequent batches must wait until the current batch is finished. Batch manufacturing may be desirable in some circumstances because it typically has relatively lower initial setup costs, and may allow for easy adaption to the specific input materials e.g., a bulk processing facility may differentiate the flow for each batch. Continuous processes, in contrast, involve moving one work unit at a time between each operation of a process, with no breaks in time, sequence, substance, or extent. Continuous flow processes can often save time, energy, and costs and when implemented correctly and/or at scale.

3D Printing has conventionally used a batch process. For example, a conventional 3D printer uses a build plate inside a printing chamber. The 3D part is created on top of the build plate (which may also be used to keep the base of the build object warm to prevent the object from cooling unevenly and warping as a result). After the part is created, the 3D printer is reset by at least resetting the position of the build plate between producing subsequent parts.

There are at least two problems with batched 3D printing. The first is the time that is lost during the reset process. The second is the limit imposed on the overall size of the manufactured part by the size of the printing chamber. That is, a part that is larger than the size of the printing chamber must be designed and printed in multiple sections for later assembly. The resulting seams, in turn, create weak points in the finished part.

Accordingly, one aspect of the disclosure is a system to perform 3D printing continuously and that enables the production of parts having a large vertical dimension. Another aspect of the disclosure is a method of 3D printing that does not lose time between productions due to resets.

Another aspect of the disclosure is a vertical conveyor that, when fitted to a 3D printer, may enable production of large size parts along the vertical axis and that enables continuous operation of a 3D printed manufacturing operation. In some embodiments, the vertical conveyor may comprise pivoting build plates that unfold to accept/support a newly-to-be-printed part/object. The pivoting build plates may subsequently fold down to release the newly-completely-printed part/object. In some embodiments, the distance (or pitch) between build plates may be adjusted to match the vertical axis requirement of the to-be-printed part. The vertical conveyor may be compatible with many 3D printing technologies, including without limitation, dual material, multi print head, multi print nozzles, multiple filaments, etc.

One feature and advantage of some embodiments is that they may enable a continuous manufacturing process for built-to-order parts/objects and print jobs, particularly with respect to 3D printing. Another feature and advantage of the moveable build plates of some embodiment is that they may enable manufacturing of seamless relatively tall parts, including plastic parts/objects printed using filament materials.

Figure 1:
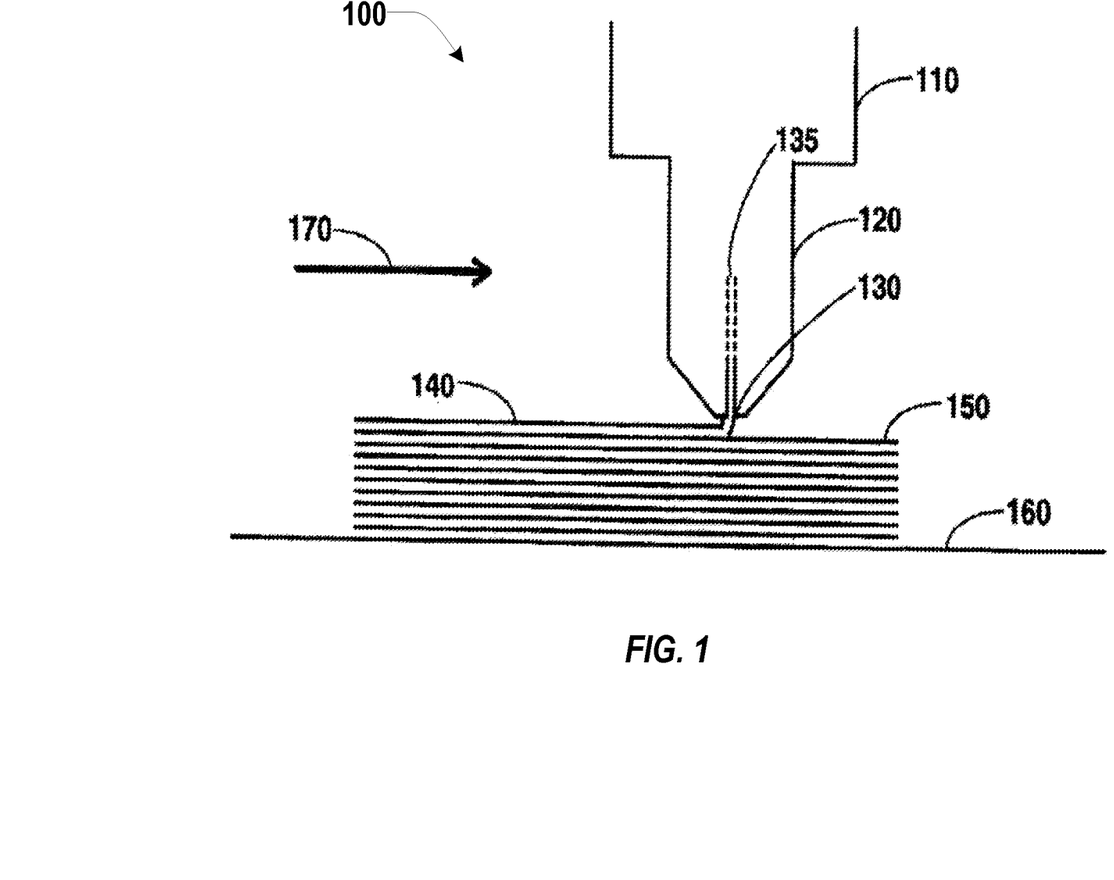
FIG. 1 is a simplified cross section of one embodiment of a 3D printer, consistent with some embodiments.

FIG. 1 is a simplified cross section of one embodiment of a 3D printer 100, consistent with some embodiments. The 3D printer 100 embodiment in FIG. 1 comprises a printer head assembly 110 and a build plate base 160 on to which the printer head assembly 110 prints the object to be printed. Head assembly 110 and build plate 160 are moveable relative to each other in the X, Y and Z directions, where X and Z are the directions of movement in the horizontal plane and Y is the direction of movement perpendicular (i.e., upwards/downwards as drawn) relative to base plate 160. As will be explained in more detail with reference to FIG. 2, the build plate 160 may be lowered in the Y direction relative to the head assembly 110, and the head assembly 110 is moved by suitably mounted and controlled electric motors (not shown) either directly or via a movement transfer mechanism, for example via drive belts, for movement in the X and Z directions. The moveable build plate 160 and the head assembly 110 cooperate to build up an object 150 of a required shape and size. Other embodiments may be envisaged in which both head assembly 110 and base 160 are moved in the Y direction to varying degrees to build up a printed object 150.

The head assembly 110 comprises printing nozzle 120, which in turn, comprises nozzle orifice 130. Nozzle orifice 130 is typically of circular cross-section, and is at the end of material feed tube 135 through which material to be printed is delivered to nozzle orifice 130. When head assembly 110 is printing, the material to be printed is fed into the printer head assembly 110 remote from nozzle orifice 130. In one embodiment, material to be printed comprises a thermoplastic, such as acrylonitrile butadiene styrene (ABS), which may be fed into head assembly 110 as a three mm diameter filament, but any suitable material and delivery form and size may be used.

The head assembly 10 may comprise a heating mechanism, for example, an electrical resistance heating element (not shown), over which the ABS filament is passed. When the ABS filament is passed over the heating element in head assembly 110, the filament is heated to a temperature above its glass transition temperature. The resulting flowable viscous plastic may subsequently be forced by a pressure source (not shown) of head assembly 110 down feed tube 135 of nozzle 120, and then extruded from nozzle orifice 130. In one embodiment, nozzle orifice 130 is of circular cross section of diameter 0.35 mm, but any suitable shape and dimensions may be used.

As the ABS thread is extruded from nozzle orifice 130, the head assembly 110 may be moved relative to base plate 160 in, for example, direction 170 to lay down an extruded filament bead 140. The extruded bead 140 may harden on cooling to produce a required shape. In one embodiment, a nozzle orifice 130 of diameter 0.35 mm produces an extruded filament bead 140 of diameter approximately 1 mm.

Head assembly 110 may be moved in a predetermined pattern relative to moveable base plate 160 in X and Z directions, and the moveable base plate 160 may be lowered vertically in the Y direction to cooperate to form an object 150 by successive layers of extruded beads 140 deposited by head assembly 110.

Figure 2:
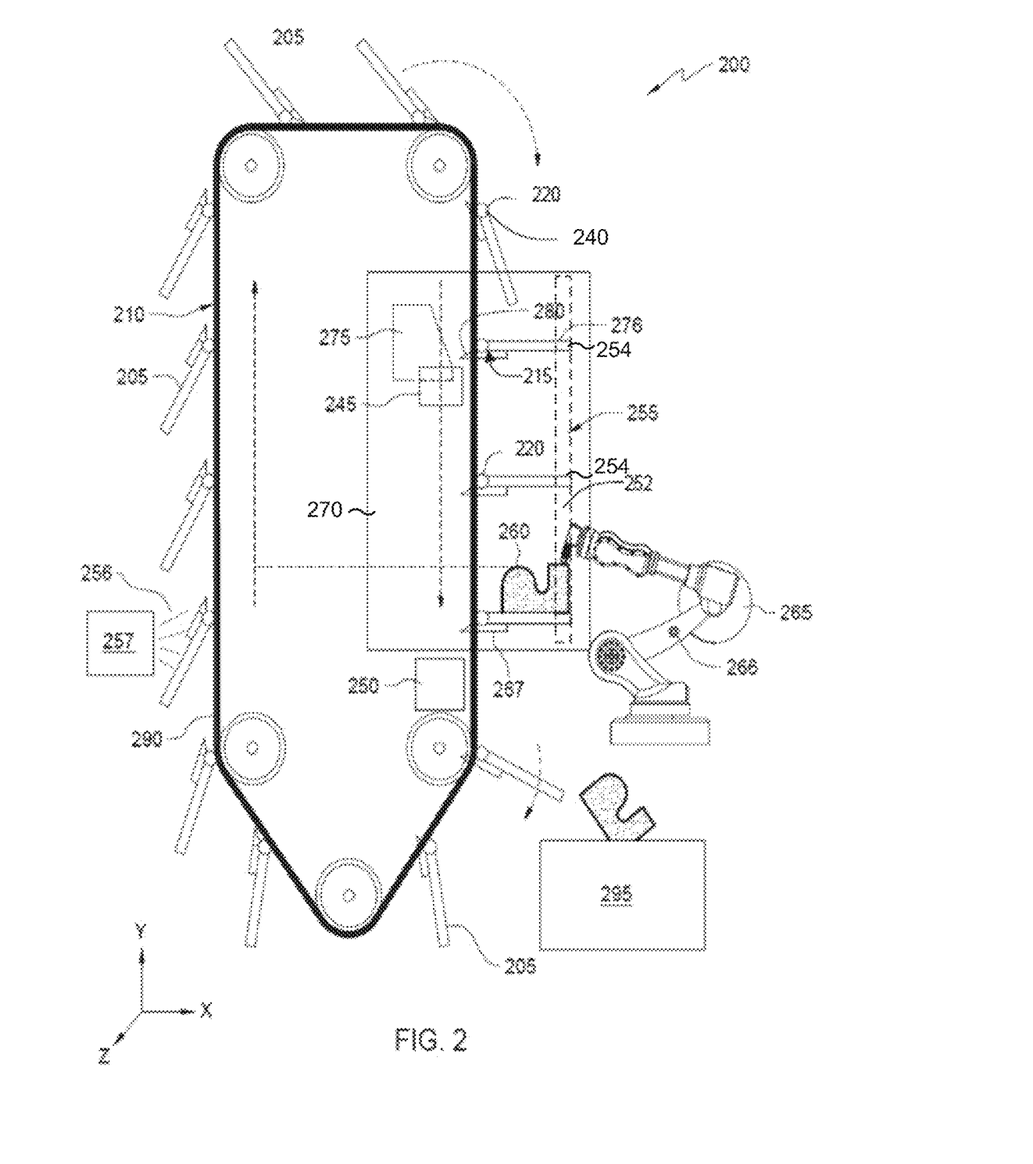
FIG. 2 is a side view of a moveable build plate (MBP) system, consistent with some embodiments.

FIG. 2 is a side view of a moveable build plate (MBP) system 200, consistent with some embodiments. This embodiment of an MPB system 200 comprises a plurality of build plates 205 (only some labeled for clarity) pivotably attached to a vertical conveyor 210 by a plurality of hinge assemblies 215. Each hinge assembly 215 allows its respective build plate 205 to pivot around a hinge pin 220 between a substantially horizontal fixed position 230 and a free swinging position 235. The MPB system 200 may also comprise a build chamber 255 in which a 3D printer 265, such as 3D Printer 100 of FIG. 1, may build a workpiece 260. The build chamber 255 includes a print plane 270 in which the 3D printer 265 is currently building the workpiece 260.

The hinge pin 220 may comprise a sliding hinge pin in some embodiments. The sliding pin may be biased between a locking position and an unlocked position by fixed cams 245 and 250. The fixed cams 245, 250 may be located on opposite sides (in the Z-direction, as depicted) of a transporter chain 290. Other systems for biasing the build plates 205, both active and passive, are also within the scope of this disclosure. For example, in some embodiments, the printing chamber of the vertical conveyor may include side channels 252, and the build plates 205 may include side bearings 254 rolled through those side channels. In other embodiments, an integrated motor 221 may actively rotate the build plates 205.

In operation, at the start of the 3D print cycle, one of the build plates 205 initially begins at a location before (i.e., counterclockwise as drawn) the top of the printing chamber 255 in a folded down state. As this build plate 205 continues to move through the MBP system 200, it will cross into the printing chamber 255. Upon crossing into the printing chamber 255, the build plate 205 is then automatically raised (i.e., unfolded) into a horizontal position (i.e., parallel to the printing plane 270 and level with the ground), allowing for printing to begin on a top surface 276. In some embodiments, the build plate may be automatically biased into the horizontal position by a first cam 275 acting against (e.g., slidably engaging) a proximal tab 280. The build plate 205 may then be locked into the horizontal position by the sliding locking pin 240. The sliding hinge pin, in turn, may be biased between a locking position and the free swinging position by cams 245 and 250.

Printing of the part 260 begins as the printing material is deposited onto the build plate 215 by the 3D printer. This printing process operates continuously until the whole part 260 is formed.

To enable continuous printing, printing material may be fed to the 3D printer 265 continuously, for example by filament injection using a continuous filament. In the other embodiments, a second robotic hand (not shown) may be positioned adjacent to the 3D printer to be able to provide material refills without stopping production. In some of these embodiments, the robotic hand may be triggered by a first sensor 266 that detects the amount of material remaining/available to the 3D printer 265 to be fed for printing as compared to a difference between a predicted weight of the completed object less a current/actual weight of the object in process. The current/actual weight of the object 360, in turn, may be measured/detected by second sensors 267 integrated into build plates 205. The signals from the first sensor 266 and the second sensors 267, in turn, may be provided to a 3D printer controller 500 (see FIG. 4). In other embodiments, the robotic hand may be triggered if the amount of material remaining in the 3D printer 265 is below a threshold weight.

Once the 3D printing is complete, the build plate 215 may be automatically folded down to allow for the printed part 260 to slowly slide off the printing area into supply 295, aided by gravity. In other embodiments, the printed part 260 may be gracefully lifted off the build plate 205 and placed in supply 295 using a mechanical hand or robot to ensure that brittle parts do not get damaged.

After the part 260 is removed from the build plate 205, the build plate 205 may be returned to the top of printing chamber 255. Optionally, the folded down build plate 205 may move through a cleanup area 256. The cleanup area 256 may contain a cleaner/decontaminator 257 that removes any debris on the build plate 205 so that the next object 260 to be printed is not contaminated by left over parts. The clean plate is then delivered by the transporter chain 290 in a folded down state to the top of the printing chamber 255 to await the next item to be printed. The cycle may then repeat itself, allowing for continuous and seamless production.

In some embodiments, the build plates 205 may be adjusted in different ways to accommodate different base sizes and allow for different angles of inclination. Several plates can be combined into one to accommodate for 3D modeling of parts that have larger bases than can be accommodated on one build plate. In these embodiments, two or more build plates may be removably attached together using, e.g., screws or clamps so that the combined plate is of sufficient size to build the desired part. The build plate can also be rotated not just horizontally (i.e., around the Z-axis, as depicted) but also in such a way that allows for it to rotate along an axis in different angles both vertically and horizontally (i.e., around the X-axis, as depicted) in some embodiments. This may allow for customizable parts that require some form of inclination of the base for the shape to be built as desired, or that otherwise benefit from a change in orientation of the layers during the printing process.

Figure 3:
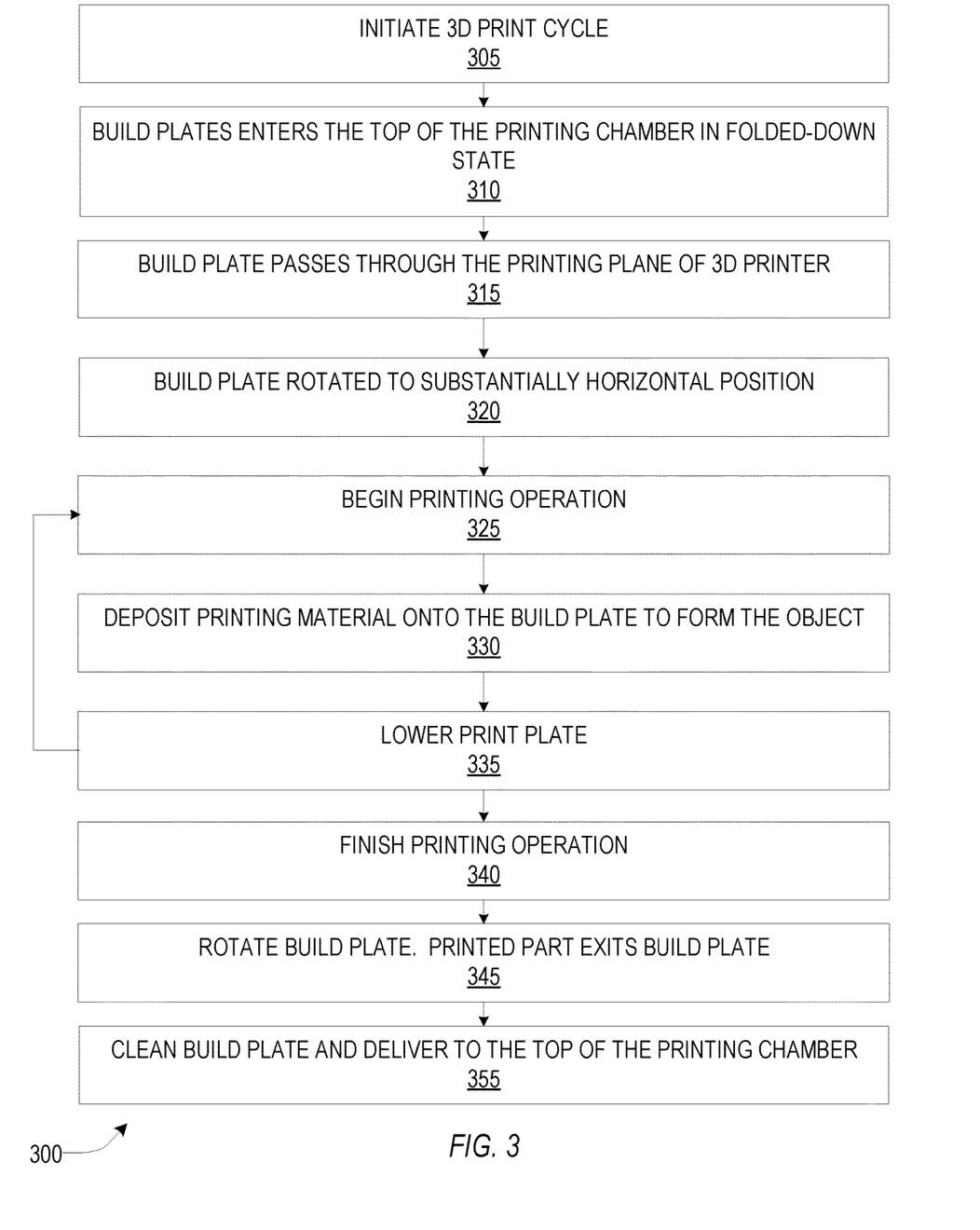
FIG. 3 is a flow chart illustrating one method of continuous 3D printing, consistent with some embodiments.

FIG. 3 is a flow chart illustrating one method of continuous 3D printing 300, consistent with some embodiments, such as the MPS system 200 of FIG. 2. At operation 305, a 3D print cycle may be initiated. Next, at operation 310, one of the build plates 205 may enter the top of the printing chamber 255 in a folded-down state. The build plate 205 may then pass through the printing plane 270 of the 3D Printer 265 at operation 315. The folded-away build plates 205 may then be folded up to accept a newly-to-be-printed part, and as discussed in more detail later, folded-down to release the newly-completely-printed part.

At operation 320, the build plate 205 may be raised to a substantially horizontal position, i.e., parallel to the printing plane 270 and level with the ground. Printing operation may begin at operation 325. During this operation, printing material may be deposited directly onto the build plate 205 at operation 330, and then the build plate may be lowered at operation 335. Printing operation may continue at loop 325-335, with additional material being deposited until the object 260 is completely formed.

The printing operation may finish at operation 340. Next, the build plate 205 is rotated back to the folded down position at operation, and the printed part slides off the build plate into supply 295, at operation 345. In some embodiments, the exit may be driven primarily by gravity. In others, an active clearing bar may assist. The transporter chain 290 may then deliver the build plate to the top of the printing chamber 255 at operation 355. This operation may optionally include a cleaning operation. Flow then returns to operation 305, and the loop may continue indefinitely.

Various aspects of the present disclosure were described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation or garbage collection, but this does not render the storage device as transitory because the data is not transitory while it is stored.

Figure 4:
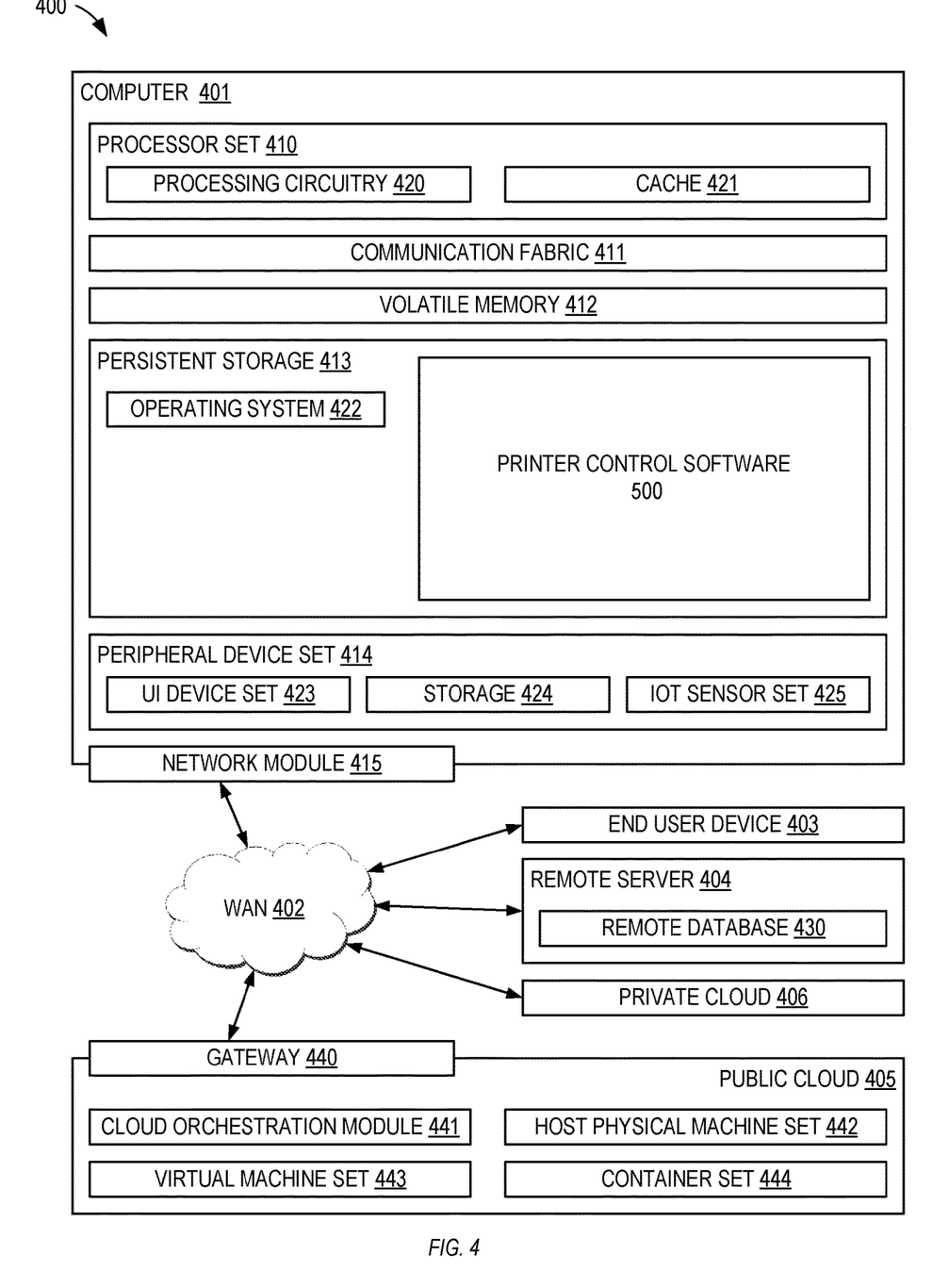
FIG. 4 is a schematic diagram of a computing environment, consistent with some embodiments.

Computing environment 400 contains an example of an environment for the execution of at least some of the computer code involved in performing the inventive methods, such as 3D printer control software 500. 3D printer control software 500 may utilize an object design document, which may comprise software that generates a sequence of operational signals to control the movement of 3D printer head assembly 110 in the predetermined pattern described above. 3D printer control software 500 may also control production of extruded material 140 from nozzle orifice 130 to build up the required three-dimensional object. The object design document may be provided to a user by an external creator as a software file, or set of files, on portable non-volatile storage and loaded to computing apparatus, or alternatively it may be downloaded from an external network such as the Internet. In some embodiments, the object design document may be created by the user on computing environment 400 using optional computer-aided design software loaded into volatile storage.

In addition to block 500, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 500, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 101, to keep the presentation as simple as possible. Computer 401 may be located in a cloud, even though it is not shown in a cloud in FIG. 4. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in block 500 in persistent storage 413.

COMMUNICATION FABRIC 411 is the signal conduction path that allows the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 412 is any type of volatile memory now known or to be developed in the future. Examples include dynamic type random access memory (RAM) or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN 402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A 3D printing system, comprising:
a vertical conveyor having a plurality of folding build plates;
a plurality of biasing devices, a biasing device, of the plurality of biasing devices, being configured to rotate a folding build plate of the plurality of folding build plates from a folded position to a substantially horizontal position when the folding build plate enters a print chamber;
cams to cause the biasing device to rotate the folding build plate from the folded position to the substantially horizontal position when the folding build plate enters the print chamber; and
a 3D print head inside the print chamber adapted to 3D print an object on the folding build plate in the substantially horizontal position,
wherein the folding build plate is configured to rotate from the substantially horizontal position to the folded position when the folding build plate exits the print chamber, and
wherein the folding build plate, in the folded position, is configured to allow the object to slide off the folding build plate.

2. The 3D printing system of claim 1, wherein the cams comprise a cam adapted to slidably engage a proximal tab of the folding build plate.

3. The 3D printing system of claim 2, wherein the biasing device comprises a sliding lock pin adapted to slidably engage a second cam of the cams.

4. The 3D printing system of claim 1, wherein the print chamber comprises side channels, and wherein the folding build plate comprises side bearings adapted to be rolled through the side channels.

5. The 3D printing system of claim 1, wherein the biasing device comprises a motor integrated into each of the plurality of folding build plates.

6. The 3D printing system of claim 1, further comprising a 3D printing controller adapted to provide a sequence of operational signals to control movement of the 3D print head for 3D printing the object.

7. The 3D printing system of claim 6, wherein the folding build plate comprises a sensor adapted to provide a signal indicative of a current weight of the object to the 3D printing controller.

8. The 3D printing system of claim 7, wherein the 3D printing controller automatically triggers a filament refill conditioned upon a detected difference between the current weight of the object and a predicted weight of the object is greater than a current amount of filament remaining.

9. The 3D printing system of claim 1, wherein the cams comprise a cam configured to cause the biasing device to rotate the folding build plate from the substantially horizontal position to the folded position when the folding build plate exits the print chamber.

10. The 3D printing system of claim 1, further comprising a cleaner adapted to remove debris from the folding build plate after the folding build plate has exited the print chamber.

* * * * *